United States Patent [19]

Norton

[11] Patent Number: 4,481,736
[45] Date of Patent: Nov. 13, 1984

[54] SEAL MEANS FOR SEALING A PANEL MOVABLE THROUGH AND FROM A SLOT

[75] Inventor: Edward W. Norton, Holcomb, N.Y.

[73] Assignee: Schlegel Corporation, Rochester, N.Y.

[21] Appl. No.: 283,441

[22] Filed: Jul. 15, 1981

[51] Int. Cl.³ .............................................. E05F 11/38
[52] U.S. Cl. ........................................ 49/373; 49/377; 49/495
[58] Field of Search ............... 49/377, 484, 485, 495, 49/496, 373

[56] References Cited

U.S. PATENT DOCUMENTS

| | | | |
|---|---|---|---|
| 2,840,416 | 6/1958 | Woodward | 49/483 X |
| 3,164,870 | 1/1965 | Harms et al. | 49/495 |
| 4,094,100 | 6/1978 | Fukumoto et al. | 49/377 X |

FOREIGN PATENT DOCUMENTS

| | | | |
|---|---|---|---|
| 1303308 | 7/1962 | France | 49/377 |
| 789425 | 1/1958 | United Kingdom | 49/377 |

Primary Examiner—Kenneth Downey
Attorney, Agent, or Firm—Cumpston & Shaw

[57] ABSTRACT

A seal member for sealing a panel movable through and from a slot. The seal member has a base for securing the seal member to a support, and a pair of outwardly diverging flexible arms having a common edge portion by which the arms are hingedly secured to the base in a normal position. Movement of the panel through and from the slot flexes the arms in unison between first and second positions, respectively. In the first position, both arms seal and guide the panel relative to the slot. In the second position, the slot is closed and the panel prevented from rattling.

7 Claims, 4 Drawing Figures

U.S. Patent  Nov. 13, 1984  4,481,736
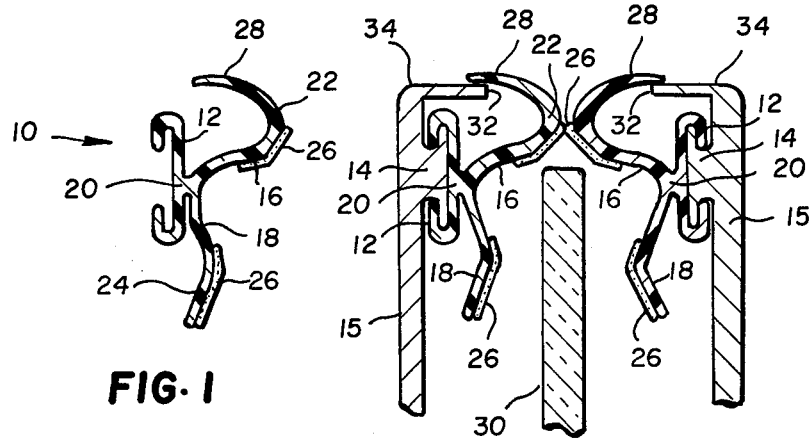
FIG. 1
FIG. 2
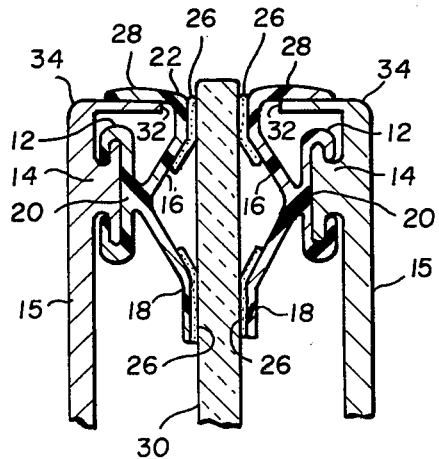
FIG. 3
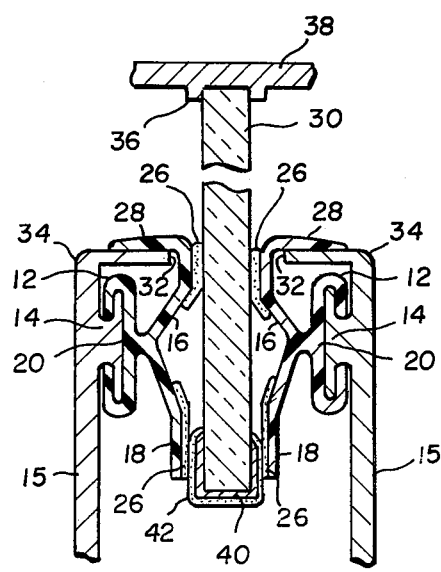
FIG. 4

SEAL MEANS FOR SEALING A PANEL MOVABLE THROUGH AND FROM A SLOT

BACKGROUND OF THE INVENTION

1. Field of the Invention

The present invention relates generally to seals. More particularly, the present invention relates to improved seal means for sealing a panel movable through and from a slot.

2. Description of the Prior Art

U.S. Pat. No. 3,742,649 discloses a seal strip for a glass pane having a base for securing the seal strip to a support, and flexible legs extending from the base toward the pane for applying a constant sealing force thereto.

U.S. Pat. No. 3,807,978 discloses a sealing guide for a window. The guide has a base and flexible legs having free edge portions extending toward the base.

U.S. Pat. No. 1,579,644 discloses a window movable through and from a slot, and having hinged tongue pieces at the slot for closing it when the window is moved from the slot.

U.S. Pat. No. 1,571,832 discloses a spring metal window guide having a base secured to a support, and a pair of flexible legs extending outwardly from the base toward opposite surfaces of the window. The guide further has another flexible leg extending outwardly from the base toward a free edge of the window.

SUMMARY OF THE INVENTION

In accordance with a preferred embodiment of this invention, a seal means is disclosed for sealing the space between a panel and slot as the panel is moved through and from the slot. The seal means comprises a novel seal member having a longitudinally extending support base, and a pair of outwardly diverging flexible arms hingedly connected at a common edge portion thereof to the base for pivotal movement in unison against the bias of the arms between two positions in response to movement of the panel through and from the slot. When the panel is moved through the slot, both arms are in sealing engagement with a surface of the panel. When the panel is removed from the slot, one arm engages an edge of the slot to close the slot, and the other arm cooperates with the panel to prevent undue lateral movement of the panel.

In other aspects of the invention, the arms are provided with resilient surfaces such as flocking or pile on the portions of the arms that engage the panel. Also, one of the arms has a flap extending toward the base to assist in closing the slot. The invention further contemplates using a pair of novel facing sealing members between which the panel is interposed.

One advantage of the seal means of this invention is its reduced weight in comparison to prior art seal means. A further advantage is the ability of the seal means to stabilize or positively locate the panel in addition to providing a seal between the panel and slot. Still another advantage of the seal means of this invention is to reduce the abrasive action of the seal means on the panel, and the effort or force needed to move the panel through and from the slot. Other advantages of the seal means are to provide a tighter seal, particularly when the panel is moved to its fully extended or closed position, and to provide a smooth, streamlined closure for the slot when the panel is withdrawn from the slot.

The invention and its advantages will become more apparent from the detailed description of the invention presented below.

BRIEF DESCRIPTION OF THE DRAWINGS

The details of this invention will be described in connection with the accompanying drawings, in which:

FIG. 1 is a cross-sectional view of a seal member of this invention;

FIG. 2 is a cross-sectional view of one embodiment of the seal means of this invention showing the panel moved from the slot to its open position, and the slot sealed;

FIG. 3 is a cross-sectional view similar to FIG. 2 of the seal means showing the panel moved a short distance through the slot; and FIG. 4 is a cross-sectional view of the seal means showing the panel moved through the slot to its fully extended or closed position.

DETAILED DESCRIPTION OF THE INVENTION

Referring to FIG. 1 of the drawings, a preferred embodiment of a seal member 10 of this invention is disclosed which is formed from any suitable resilient material. Preferably, the seal member is formed by extruding a polymeric material through a properly shaped die, not shown, in a manner well known in the art.

Seal member 10 comprises an elongated base 12 of substantially C-shaped cross-section for mounting or securing the seal member to any suitable support flange 14, shown in FIGS. 2-4. The base 12 may be of any other suitable cross-sectional shape, such as rectangular, for example. Such a rectangular base could be inserted into any suitably shaped slot in the support member, or attached to the support member by screws, adhesive or the like.

Seal member 10 further has upper and lower flexible arms 16, 18 respectively which have a common edge portion 20 at which the arms are hingedly secured to base 12. Free edge portions 22, 24 of arms 16, 18 respectively extend away from base 12 with edge portion 22 laterally extending a further distance therefrom than edge portion 24. Edge portions 22, 24 are further provided on surface portions thereof with a yieldable sealing material such as flocking or pile 26 which may be applied by any suitable means during or following the seal member extrusion operation. Edge portion 22 also has a reversely bent flap 28 extending toward base 12 for a purpose to be explained hereinafter.

With reference to FIGS. 2-4, a pair of seal members 10 are shown mounted on flanges 14 of structural support members 15 to form a preferred embodiment of the seal means of this invention for sealing the space between a panel 30 and a slot 32 as the panel is moved through and from the slot. Although the seal means of this invention is shown in FIGS. 2-4 for use in combination with a structural support member, such as an automobile door in which the panel is a curved or planar glass window, it should be understood that the seal means is applicable to any panel and slot arrangement, such as found in building products, for example.

With reference to FIG. 2, panel 30 is shown in its lowermost or open position in which it is withdrawn from slot 32. In this panel open position, upper arms 16 are moved by their own resilience about hinged edge portion 20 toward their normal unflexed position, shown in FIG. 1, causing arms 16 to move together and pile surfaces 26 thereof to sealingly engage one another to close slot 32. Flaps 28 are properly designed to cooperate, in this panel open position, with surfaces 34 of support members 15 to form a smooth streamlined closure surface, and to assist in closing or sealing slot 32. The closed slot prevents foreign material such as water, dirt or the like from passing through the slot and interfering with the smooth functioning of the panel moving mechanism, not shown. In this panel open position, the lower arms 18 are retracted from opposite surfaces of the upper free edge of panel 30, and provide flexible stop means to prevent undue lateral movement or rattling of the upper edge of the panel.

With reference to FIG. 3 the upper edge of panel 30 is moved through slot 32 causing arms 16 to separate and move about hinged edge portion 20 in a direction against the normal bias of arms 16, 18. Accordingly, flexed arms 16 cause pile surfaces 26 to sealingly engage the panel surfaces, and along with flaps 28, prevent foreign material from passing through slot 32. In this FIG. 3 position, lower arms 18 are moved into engagement with or adjacent to the panel surfaces to assist arms 16 in providing a guide or stabilizer for panel 30.

With reference to FIG. 4, panel 30 is shown in its uppermost or closed position with the upper free edge of the panel engaging a seat 36 on the upper door jamb 38. In this panel closed position, upper arms 16 sealingly engage opposite surfaces of the panel, as in FIG. 3. Lower arms 18 are flexed outwardly by a U-shaped rail 40 on the lower edge of the panel causing the pile surface 26 on arms 18 to sealingly engage the outer surface of the rail. To increase the sealing action of the lower seal, rail 40 is preferably provided with a flocked or pile surface 42.

While a presently preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. Seal means for sealing the space between a panel and a slot as the panel is moved through and from the slot comprising:
   a structural member defining an elongated slot;
   a panel movable through and from said slot; and
   a longitudinally extending seal member having a base mounted on said structural member, said seal member further having a pair of diverging flexible arms, each of said arms having a layer of resilient pile material attached thereto for engaging the surface of said panel, said arms hingedly connected at a common edge portion thereof to said base and biased in one direction, said arms being pivotally movable in unison in the opposite direction against the bias of said arms between first and second positions in response to movement of said panel through and from said slot respectively whereby in said first position, both of said arms are in sealing engagement with a surface of said panel, and in said second position, one of said arms closes said slot and said other arm cooperates with said panel to prevent undue lateral movement of said panel.

2. Seal means according to claim 1 wherein one of said arms has a flap extending toward said base to assist in closing said slot.

3. Seal means according to claim 1 wherein another identical seal member is mounted on the opposite side of said panel from said other seal member, and faces said other seal member.

4. A seal member for sealing the space between a slot and a panel movable through and from the slot comprising:
   a longitudinally extending base; and
   a pair of longitudinally extending diverging flexible arms having a common edge portion hingedly connected to said base for pivotal movement of said arms in unison in clockwise and counter-clockwise directions about said common edge and normally biased in one of said directions, said arms further having free edge portions opposite said common edge portion; and
   a sealing member connected to the free edge portion of at least one of said arms for sealing said slot when said panel is moved from said slot.

5. A seal member according to claim 4 wherein said arms are provided at the free edge portions thereof with resilient surfaces.

6. A seal member according to claim 5 wherein said resilient surfaces comprise pile material.

7. A seal member according to claims 4, 5 or 6 wherein said arms are resiliently biased into a normal position in which one of the free edge portions of one arm laterally extends further from said base than the free edge portion of said other arm.

* * * * *